United States Patent [19]
Peek et al.

[11] Patent Number: 6,132,885
[45] Date of Patent: Oct. 17, 2000

[54] COMPOSITES PREPARED WITH READY-TO-USE RESIN/WAX EMULSION ADHESIVES

[75] Inventors: Brian M. Peek; Barry W. Sewell, both of Conyers; Roger Scott Johnson, Snellville; Daniel DiCarlo, Covington, all of Ga.

[73] Assignee: Georgia-Pacific Resins, Inc., Atlanta, Ga.

[21] Appl. No.: 08/793,731

[22] PCT Filed: Aug. 30, 1996

[86] PCT No.: PCT/US96/14130

§ 371 Date: Mar. 3, 1997

§ 102(e) Date: Mar. 3, 1997

[87] PCT Pub. No.: WO98/08675

PCT Pub. Date: Mar. 5, 1998

[51] Int. Cl.[7] .................................................. B32B 21/00
[52] U.S. Cl. .................. 428/485; 156/331.3; 156/331.9; 156/335; 428/528
[58] Field of Search ...................................... 428/485, 528; 156/62.2, 331.3, 331.9, 335

[56] References Cited

U.S. PATENT DOCUMENTS

| | | |
|---|---|---|
| 2,682,516 | 6/1954 | Wilder et al. . |
| 3,443,986 | 5/1969 | Watanabe et al. . |
| 4,361,612 | 11/1982 | Shaner et al. . |
| 4,407,999 | 10/1983 | Fushiki et al. . |
| 4,439,575 | 3/1984 | Schwarz . |
| 4,758,478 | 7/1988 | Daisy et al. . |
| 5,047,275 | 9/1991 | Chiu . |

*Primary Examiner*—Jenna Davis
*Attorney, Agent, or Firm*—Banner & Witcoff, Ltd.

[57] ABSTRACT

A single package, ready-to-use (RTU) resin/wax emulsion adhesive and a method of preparing the same by heating a thermosetting resin and adjusting the pH of the wax emulsion prior to combining the resin and wax emulsion. The use of the adhesive in making bonded composites such as wood products, including oriented strand board (OSB), parallel strand lumber, wafer board and particle board composites.

20 Claims, 6 Drawing Sheets

INTERNAL BOND OF BOARD SAMPLES

COMPOSITES PREPARED WITH READY-TO-USE RESIN/WAX EMULSION ADHESIVES

FIELD OF THE INVENTION

The invention is directed to a single package, ready-to-use (RTU) adhesive combining a thermosetting resin and a wax emulsion sizing agent, a process for preparing the adhesive composition and the use of the adhesive in making bonded composites such as wood products, including, parallel strand lumber, oriented strand board (OSB), wafer board and particle board, and textile products, including ceiling tiles.

BACKGROUND OF THE INVENTION

There are a variety of adhesives for composites such as particle boards, fiber boards, and textile composites. Generally these adhesives are made from urea resins, urea-melamine resins, phenolic resins, and the like. In order to impart sufficient water-resistant properties to the constructions made with these resins, attempts have been made to combine a wax emulsion sizing agent with the resin. However, it has been very problematic to obtain a stable blend of resin and wax emulsion. Wax solids may not remain homogeneously suspended in mixtures with water-borne resins, particularly during transport, transfer, and use. Thus, the resin-wax blend needs to be used immediately or else separation occurs resulting in non-uniformity in the water-repellency and bond quality imparted to the composite by the adhesive. Further, since wood shrinks and swells as its moisture content varies, if the composite is not properly treated with a sizing agent and resin, the composite will have less integrity or debond on exposure to moisture.

Often the wax emulsion is combined with the resin at the time of use. Of course this complicates handling and mixing at the site of use. It would be much more convenient to provide the user with a ready-to-use adhesive that requires no mixing prior to application.

U.S. Pat. No. 4,407,999 attempts to provide a single component, ready-to-use (RTU), water repellant adhesive composition for wooden material, purportedly having good blendability and storage stability. The adhesive consists essentially of a paraffin emulsion containing oxidized paraffin and a resin such as a phenolic resole resin. This patent suggests that by using an oxidized paraffin having an acid value of from 10 to 70 and a melting point of from 30 to 90° C., with the conventional paraffin wax component, one can successfully prepare a pre-blended adhesive from the resin and wax emulsion. Too low an acid value makes emulsification of the wax difficult; too high a value reduces the water resistance of the composite. The wax emulsion is prepared in the presence of a surfactant and/or a water-soluble alkali metal compound such as sodium hydroxide. Blending of wax emulsion and resin is carried out from ambient temperature to 60° C.

SUMMARY OF THE INVENTION

Applicants have discovered that adjusting the pH of the wax emulsion to closely match that of the resin and heating the resin prior to addition of the wax emulsion greatly improved resin/wax compatibility and handling. Applicants further discovered that the resultant resin/wax adhesive blend provided composites having unexpectedly improved thickness swell and water absorption properties over composites made with prior art technology, i.e. resin-wax blends not treated with the combination of pH adjustment and heating. The adhesive also provided good storage life and low odor. The resin/wax emulsion adhesive of the present invention eliminates the need to handle multiple raw materials at the site of use.

The present invention is directed to a composite prepared by combining a furnish and a ready-to-use, single package, adhesive composition. The adhesive composition comprises a combination of a thermosetting resin and a wax emulsion prepared by:

(a) heating the thermosetting resin to an initial temperature of above 40° C., wherein the resin has a pH of about 9 to 12;

(b) adjusting the pH of a wax emulsion to within about 1 pH unit of the resin; and (c) combining the wax emulsion with the resin and mixing while maintaining the temperature of the resin above 40° C.

BRIEF DESCRIPTION OF THE DRAWINGS

FIG. 1 shows Internal Bond strength results.

FIG. 2 shows % Thickness Swell performance.

FIG. 3 shows % Water Absorption performance.

FIG. 4 shows Internal Bond strength results.

FIG. 5 shows % Thickness Swell performance.

FIG. 6 shows % Water Absorption performance.

DETAILED DESCRIPTION OF THE INVENTION

Figure 1:
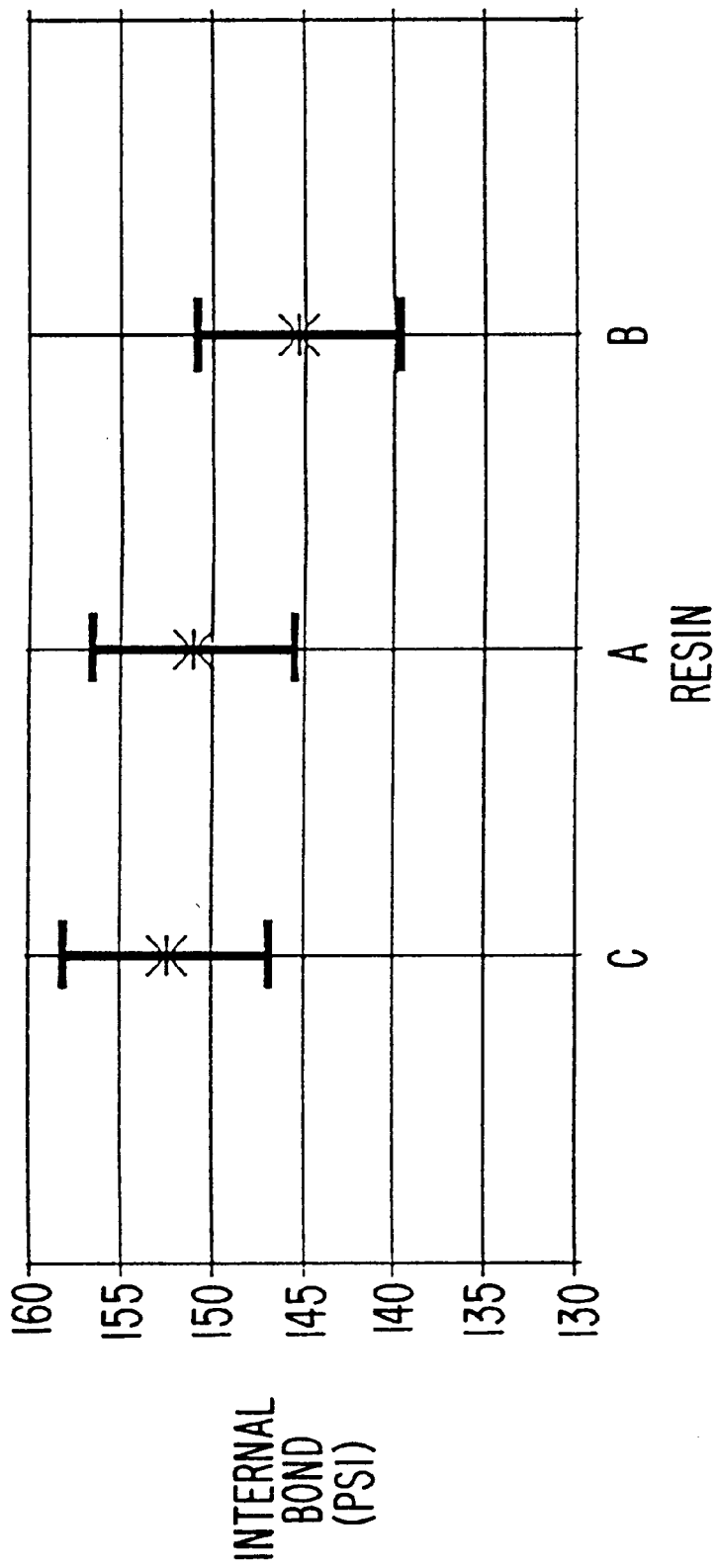
FIGS. 1, 2, and 3 depict data from a strand board study using the RTU resin/wax system of the present invention.

The present invention combines a resin and a wax emulsion sizing agent into a single-component or ready-to-use (RTU) adhesive. The RTU adhesive is then provided to the consumer in a single package. The wax emulsion sizing agent (hereinafter "wax emulsion") is used principally to impart water-resistance to the final composite construction. The RTU adhesive has increased wax compatibility, substantially no foaming problems, and provides unexpected performance improvements in thickness swell and water absorption properties of the final product without degradation of other properties.

The resin may be any thermosetting (formaldehyde-based) resin used in preparing adhesives for bonding composite wood products such as phenol-formaldehyde resins, phenol-resorcinol-formaldehyde resins, urea-melamine-formaldehyde resins, melamine-formaldehyde resins, phenol-melamine-formaldehyde resins, melamine-urea-resorcinol-formaldehyde resins, and combinations thereof. Preferably the resin is a phenol-formaldehyde resole resin (phenolic resin).

The resins may be prepared by any suitable method to provide an adhesive resin having a final pH of between about 9 and 12 and a sufficiently high formaldehyde mole ratio to make the resin thermosetting. For example, a phenolic resole resin is prepared to provide a formaldehyde to phenol mole ratio of about 1:1 to 3:1, preferably, about 1.8:1 to 2.7:1. The present invention is not limited to any particular process of preparing the resin and methods are well known to those skilled in the art.

Skilled practitioners recognize that the reactants used to prepare the resin are commercially available in many forms.

Any form which can react with the other reactants and which does not introduce extraneous moieties deleterious to the desired reaction and reaction product can also be used in the preparation of the resins used in the adhesives of the present invention.

Formaldehyde, for instance, is available in many forms. Paraform (solid, polymerized formaldehyde) and formalin solutions (aqueous solutions of formaldehyde, sometimes with methanol, in 37 percent, 44 percent, or 50 percent formaldehyde concentrations) are common. Instead of formaldehyde, other aldehydes may be used such as acetaldehyde, and propionaldehyde. Typically, formalin solutions are preferred as the aldehyde source.

The phenol component of the resin includes any phenol typically used in preparing phenolic resole resins. Typically, ordinary phenol is used, but the phenol may be partly or completely substituted with xylenols, cresols, catechol, resorcinol, alkyl resorcinols, other naturally occurring or synthetic phenols or alkyl phenols such as cresylic acids, urea, melamine, or combinations thereof.

Urea is available in many forms. Solid urea, such as prill, and urea solutions, typically aqueous solutions, are common. Urea is also available in combination with formaldehyde as a UF concentrate.

Melamine is also commercially available and the melamine may be totally or partially replaced with other aminotriazine compounds. Other suitable aminotriazine compounds include substituted melamines, or cycloaliphatic guanamines, or mixtures thereof.

Any suitable catalyst may be used to form the thermosetting resin. Phenolic resins, for instance, typically use alkali metal hydroxides, alkaline earth hydroxides, ammonium hydroxide, metal carbonates, and amines. Preferably the catalyst for preparing a phenolic resin is sodium hydroxide.

The wax emulsion (also known as paraffin emulsions) may be formed from natural waxes such as slack wax, whale wax, pappy wax, honey wax, and chinese wax, or from synthetic waxes such as esters of fatty acids, for example, n-octadecyl palmitate and cetyl stearate. Slack wax, a solid at ambient temperatures, is a by-product of oil refining processes, is sold as a commodity product, and is a preferred wax for reasons of economy and its high melting temperature. The present invention is not limited to any particular wax so long as the wax provides the desired sizing or water-repellant properties in the end product.

The wax emulsion is a wax-in-water emulsion and is typically formed by, for example, stirring molten wax into water in the presence of a dispersant, emulsifier or surfactant. Most commercial wax emulsions may be used. Preferably, no additional surfactants, other than what was needed to produce a stable wax emulsion, are added to the combined resin and emulsion. Some surfactants can lead to foaming problems resulting in poor handling problems. Further, any dispersant, emulsifier, or surfactant used in the emulsion, must not affect the final resin/wax emulsion adhesive qualities. For example, lignosulfonate-based dispersants provide suitable wax-in-water emulsions whereas our experience indicates that fatty-acid based dispersants are less desired.

Typically, a sufficient amount of the wax emulsion is blended with the resin to impart the desired level of water-resistant properties to the final composite. Generally, the amount will not exceed 50 wt % of the total adhesive used. The preferred amount will depend on the composites intended use and target properties. In most cases, the wax emulsion will be used in an amount between about 4 wt % and 33 wt % based on solids of the resin/wax emulsion adhesive.

Prior to addition of the aqueous wax emulsion to the aqueous resin, the pH of the wax emulsion is adjusted to closely match the pH of the resin. Alternatively, the pH of the resin may be adjusted to closely match that of the wax emulsion. Either way, the pH of the resin and the wax emulsion need not be identical but should be within about 1 pH unit. For example, if the pH of the resin is 10, the pH of the wax should be adjusted to between about 9 and 11 prior to mixing with the resin. The pH of a phenolic resole resin prior to combining with the wax emulsion is preferably about 9 to 12, more preferably about 11.5.

The pH of the wax emulsion is adjusted by adding an effective amount of a suitable alkaline material or base. The base must be selected so it does not, for example, negate the dispersing effect of the wax solids in the emulsion or destabilize the resin or the emulsion. Suitable bases include, but are not limited to sodium hydroxide (caustic), amines, ammonium hydroxide, and carbonates. Any effect the base may have on the resin or emulsion depends on the particular resin and wax being used.

Further, prior to combining the resin with the wax emulsion, the resin is heated to an initial temperature above about 40° C., preferably, about 60 to 85° C., more preferably, about 60 to 75° C. The temperature of the resin depends on the particular wax and its softening and melting properties, and also the compatibility of the wax and the resin. Adding the wax emulsion at higher temperatures generally increases the compatibility of the phenolic resole resin and wax emulsion and apparent water-soak properties of composites made using the blend.

After adjusting the pH and heating the resin, the wax emulsion is combined with the resin with mixing while the resin is still hot. The temperature of the combined resin and wax emulsion is preferably maintained within 5° C. of the initial temperature during addition of the wax emulsion.

The resin and wax emulsion combination of the present invention can be used to improve the water absorption properties of any composite product that is prepared using a furnish, a sizing agent and a thermosetting resin. The furnish may be wood, textile, or wood/textile combinations. Wood furnish include fibers, particles, scrim, flakes, veneer, and the like, and combinations thereof. Textile furnish include fibers of polyester, nylon, and the like. Examples of composites include, but are not limited to, oriented strand board (OSB), wafer board, particle board, hardboard, medium density fiberboard (MDF), SCRIMBER®, laminated veneer lumber (LVL), plywood, oriented strand lumber, parallel strand lumber, and textile fiber mats (e.g. for ceiling tiles and sound insulation).

The resin and wax combination may be applied to the furnish in any suitable manner, for example, as atomized drops using a sprayer or spinning disk or by a roll coater. The resinated furnish may then be formed into a mat and placed into a hot press at 350 to 450° F. for consolidation into a unitary composite. Those skilled in the art appreciate that other types of pressing equipment or heating equipment such as radio-frequency devices and steam injection presses can be used. Appropriate pressure is applied to the mat to compress to the desired final thickness for a time sufficient to allow the resin to cure and bond the furnish or consolidate the composite.

EXAMPLES

The invention will be further described by reference to the following examples. These examples should not be construed in any way as limiting the invention to anything less than that which is disclosed or which could have been obvious to anyone skilled in the art.

Example 1

A ready-to-use adhesive can be prepared by the following procedure. The mole ratios, temperatures, etc. may be modified as necessary to obtain appropriate product performance requirements.

First a phenolic resin is prepared using known procedures from the following ingredients (parts by weight):

28 parts phenol
13 parts water
36 parts 50% formaldehyde
11 parts 50% caustic
4 parts urea The temperature of the resin is adjusted to 60° C. The pH of a wax emulsion is adjusted to within 1 pH unit of the pH of the phenolic resin, for instance with caustic, and then 8 parts by weight of the pH adjusted wax emulsion is added to 92 parts by weight of the resin and mixed. The temperature of the resin is maintained at a temperature of at least 60° C. during the mixing and then the mixture is cooled.

Example 2

Adhesive system C was prepared by conventionally cold blending a wax emulsion with a PF resin made in accordance with the process of Example 1 (excluding pH adjustment of the wax emulsion and the hot blending of the resin and wax). Adhesives A and B were prepared in accordance with the process of Example 1 including pH adjustment of the wax emulsion and the hot blending of the resin and wax emulsion. Emulsion A used wax emulsion BW-048 obtained from Dominion Chemical Company. Emulsions B and C used wax emulsion 2057B obtained from HTI (Hopton Technologies, Inc.)

Panels were manufactured using the below-listed parameters:

| Furnish | Southern Yellow Pine Flakes produced from dimensional lumber |
|---|---|
| Furnish Moisture Content | 2.4% |
| Board Thickness | 7/16" |
| Resin Solids in Board | 6% |
| Board Density | 40 PCF |
| Final Mat Moisture | 7.2% |
| Hot Press | 400° F./600 psi initial, 60 psi final |
| Pressure released on mat | over final two minutes of press time |
| Time in Hot Press | 4 min. |

Two panels were used for each condition. Two samples were taken from each panel to determine thickness swell and water absorption. Four samples were taken from each panel to determine Internal Bond (IB). The median results are reported below.

| | ADHESIVE | | |
|---|---|---|---|
| Measurement (median) | A | B | C |
| IB | 151 | 145 | 153 |
| Thickness Swell(%) | 16.5 | 16.3 | 18.1 |
| Water absorption(%) | 50.2 | 52.0 | 54.9 |

Figure 2:
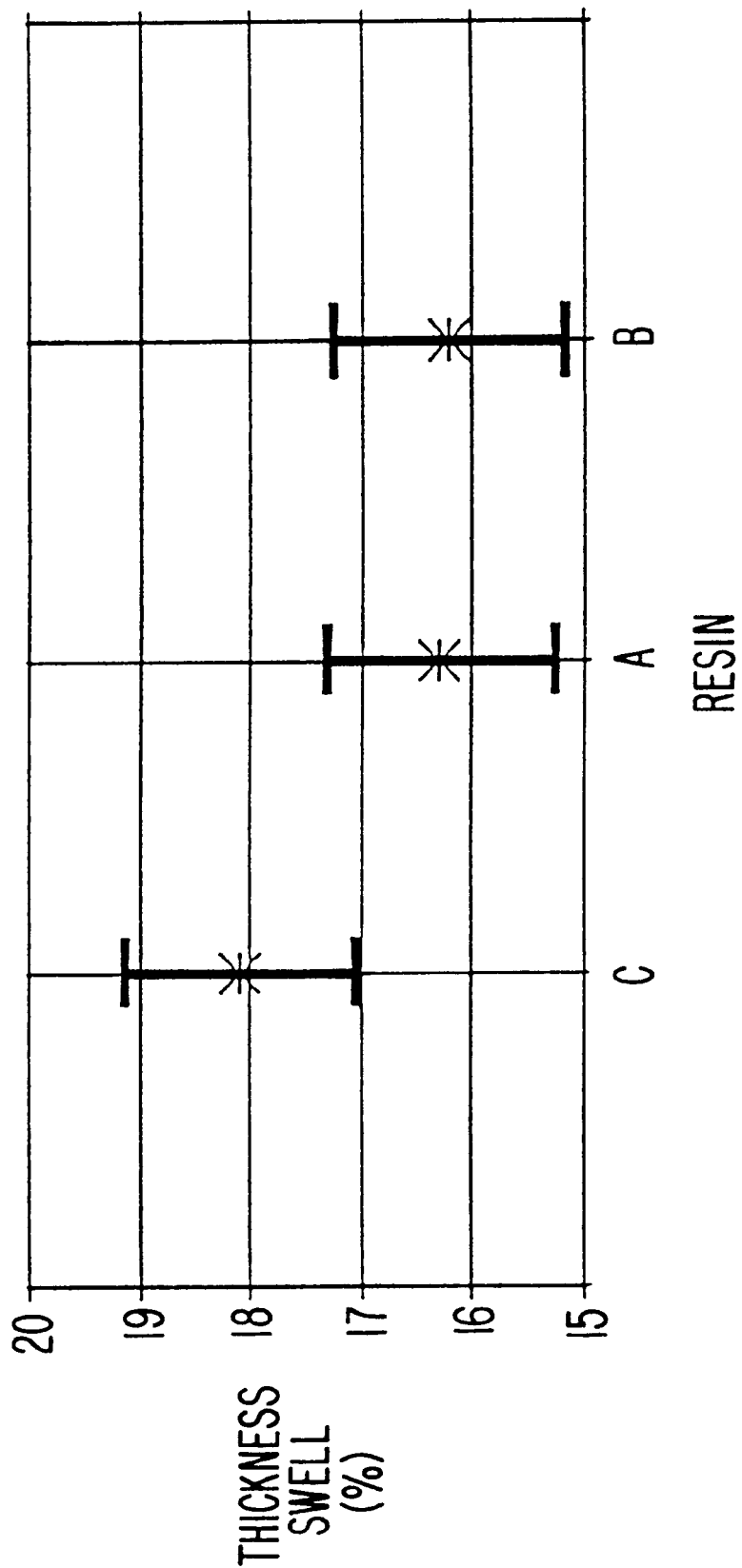
Figure 3:
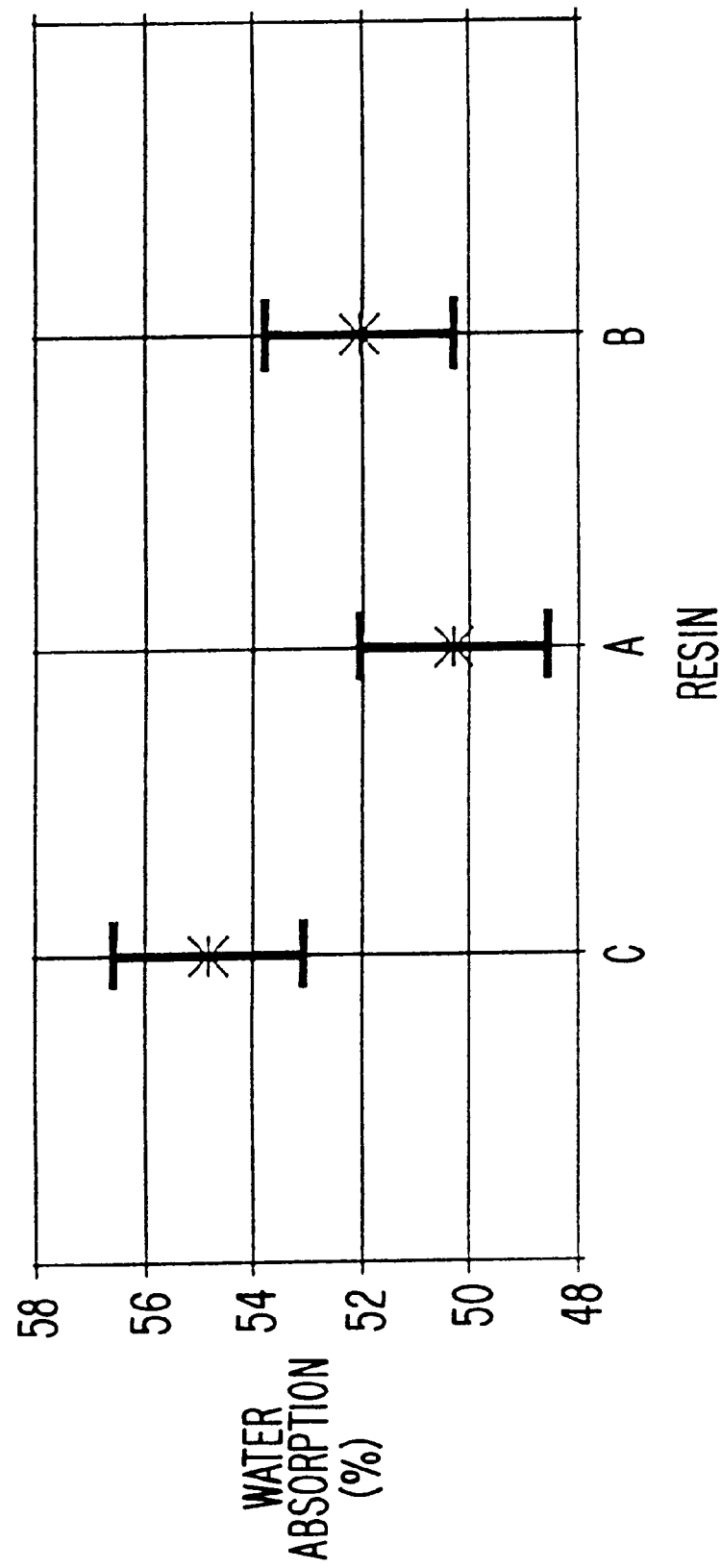

FIGS. 1, 2, and 3 depict the average of the samples and the 95% confidence interval of the average for the samples from strand board studies using the RTU resin/wax system.

FIG. 1 shows that Internal Bond strength was not significantly affected by the hot blend procedure of the present invention.

FIG. 2 shows that the % Thickness Swell performance improved using the RTU adhesive of the present invention.

FIG. 3 shows that the % Water Absorption performance improved using the RTU adhesive of the present invention.

Example 3

A study was made using two different wax emulsions, previously pH adjusted to within 1 pH unit of the resin, at both a 25° C. and a 75° C. blending temperature. The resin was prepared in accordance with Example 1 and the wax emulsion was added at either cold (25° C.) or hot (75° C.) temperatures. Panels were prepared and used in accordance with Example 2. The wax emulsions used were Dominion Chemical Company's BW-048 and Polypro's Prowax 45. Both of the wax emulsions performed equivalently in this study and the data were combined for presentation in FIGS. 4, 5, and 6.

Figure 4:
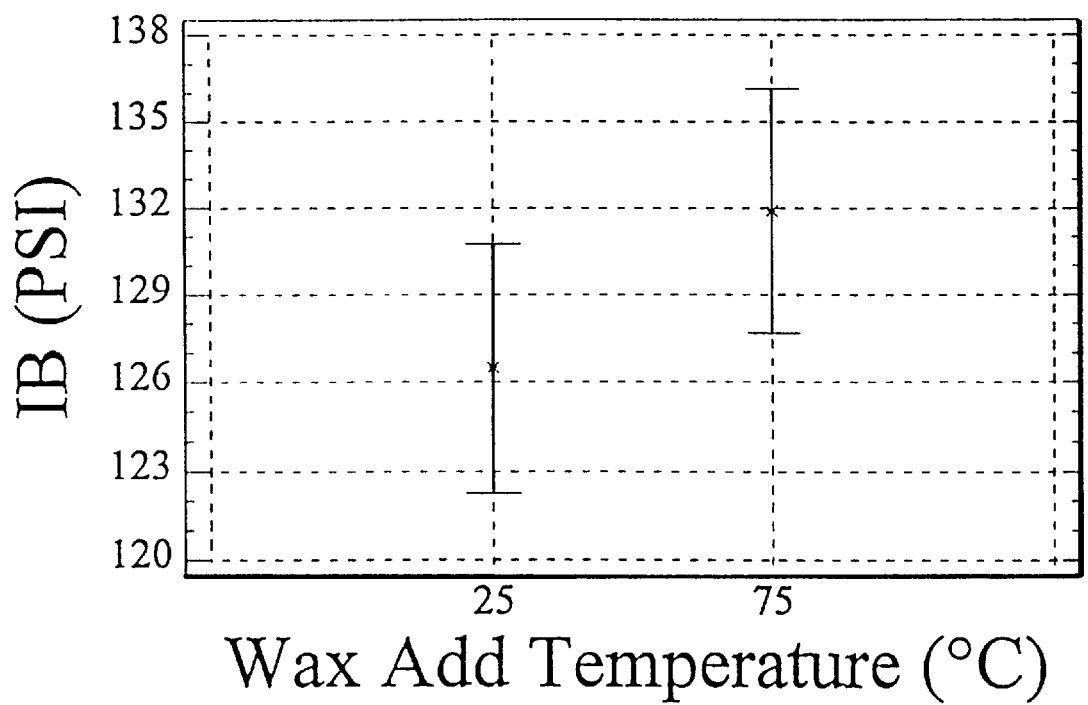
FIGS. 4, 5, and 6 depict data from a strand board study using two different wax emulsions in the RTU resin/wax system using a 25° C. or a 75° C. resin-wax blending temperature.

FIG. 4 shows that wax addition temperature has no significant effect on Internal Bond. That is the RTU adhesive of the present invention performed as well as or better than traditionally prepared cold blended resin and wax emulsion.

Figure 5:
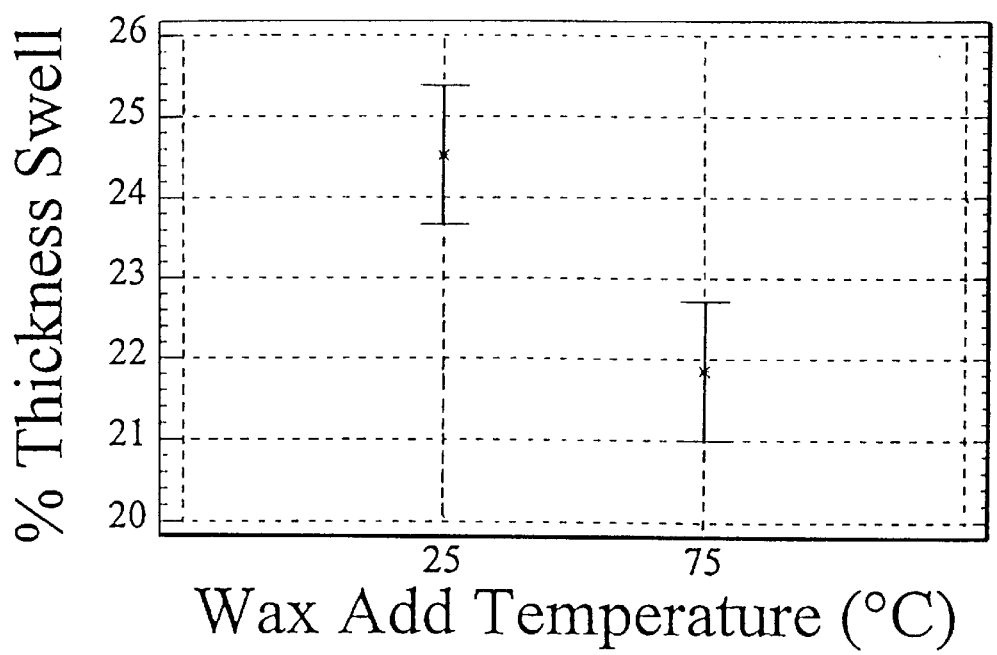

FIG. 5 shows that the addition of the wax emulsion at an elevated temperature provided improved % Thickness Swell performance in the composites.

Figure 6:
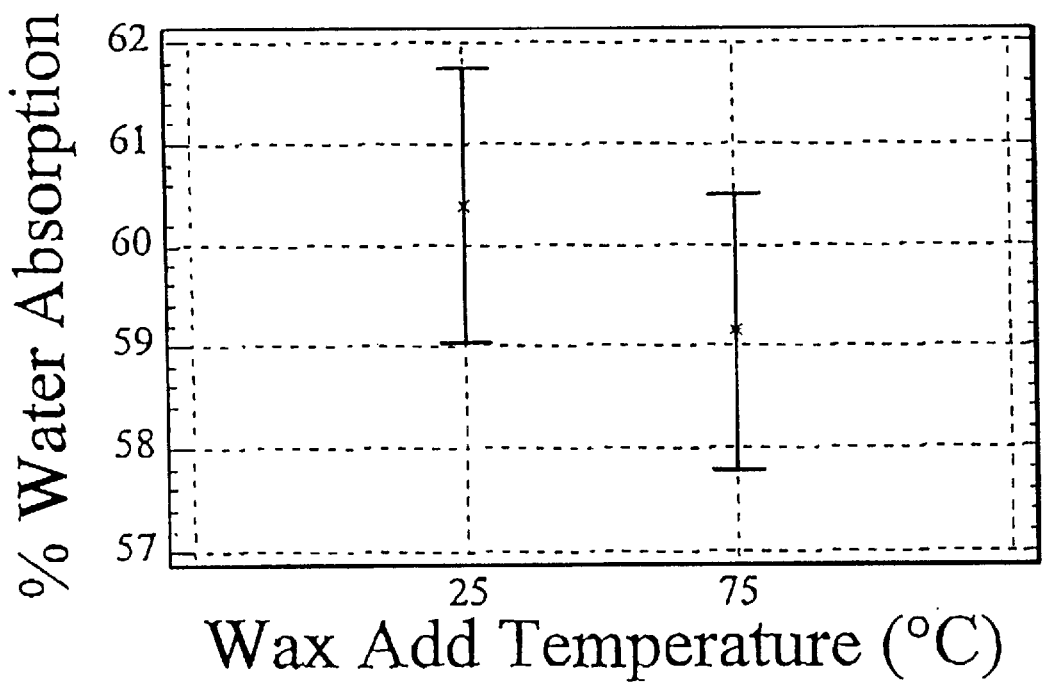

FIG. 6 shows that the addition of the wax emulsion at an elevated temperature provided improved % Water Absorption performance in the composites.

Example 4

A phenol-formaldehyde resin having a mole ratio of about 2.0 was combined with a wax emulsion in the following four ways:

(1) resin at 25° C. and wax emulsion as received at pH 6.5.
(2) resin heated to 60° C. and wax emulsion as received at pH 6.5.
(3) resin at 25° C. and wax emulsion adjusted to pH 11.5.
(4) resin heated to 60° C. and wax emulsion adjusted to pH 11.5.

Panels were manufactured using the below-listed parameters:

| Furnish | Southern Yellow Pine Flakes produced from dimensional lumber |
|---|---|
| Furnish Moisture Content | 3.2% |
| Board Thickness | 7/16" |
| Resin Solids in Board | 6% |
| Board Density | 42 PCF |
| Final Mat Moisture | 8.8% |
| Hot Press | 400° F./600 psi initial, 60 psi final, pressure stepped down after 1 min. |
| Time in Hot Press | 2.8 min. |
| Hot Stack | overnight |
| Tests | Internal Bond - 4 samples |
| | Thickness swell - 3 samples |
| | Water absorption - 3 samples |

Two panels were used for each condition. Two samples were taken from each panel to determine thickness swell and water absorption. Four samples were taken from each panel to determine Internal Bond (IB).

Results: The diagrams below summarize the average of results of internal bond, water absorption, and thickness swell tests for the resin/wax adhesives (1)–(4).

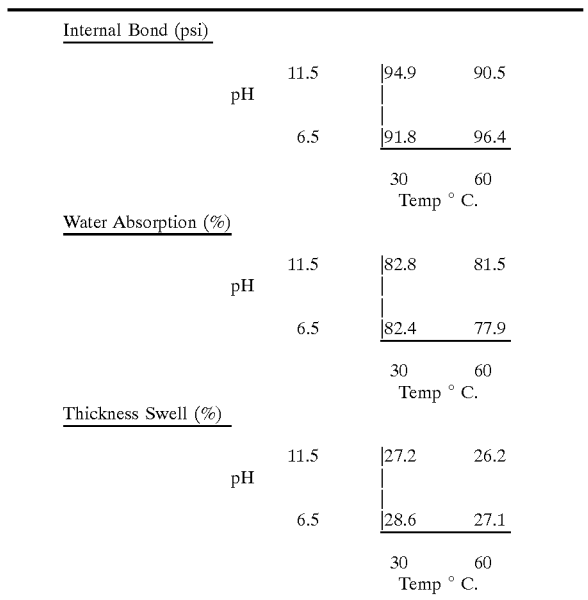

The above data demonstrates that internal bond and water absorption of the panels were not significantly affected by the conditions for preparing the adhesive blend. However, there was an improvement (reduction) in % thickness swell if either the pH of the wax emulsion was adjusted or the wax emulsion was added to a hot resin but the largest improvement in % thickness swell occurred when both the pH of the wax emulsion was adjusted and the emulsion was added to a hot resin.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A composite prepared by bonding a furnish with a ready-to-use, single package, adhesive composition wherein the composition comprises a combination of a thermosetting resin and a wax emulsion prepared by:
   (a) heating the resin to an initial temperature of above 40° C., wherein the resin has a pH of about 9 to 12;
   (b) adjusting the pH of a wax emulsion to within about 1 pH unit of the pH of the resin; and
   (c) combining the wax emulsion with the resin and mixing while maintaining the temperature of the resin above 40° C.

2. The composite of claim 1 wherein the furnish is wood furnish.

3. The composite of claim 2 wherein the wood furnish is selected from the group consisting of wood fiber, particles, scrim, flakes, strand, veneer, or combinations thereof.

4. The composite of claim 1 wherein the resin is a phenol-formaldehyde resole resin.

5. The composite of claim 4 wherein the formaldehyde to phenol ratio is between about 1:1 to 3:1.

6. The composite of claim 1 wherein the initial temperature is between about 60° C. and 85° C.

7. The composite of claim 6 wherein the initial temperature is between about 60° C. and 75° C.

8. The composite of claim 6 wherein the temperature is maintained within 5° C. of the initial temperature.

9. The composite of claim 1 wherein the pH of the wax emulsion is adjusted with an effective amount of a base.

10. The composite of claim 9 wherein the base is sodium hydroxide.

11. A process of making a composite comprising applying a ready-to-use, single package, adhesive composition to a furnish and then pressing and heating;
   wherein the composition comprises a combination of a thermosetting resin and a wax emulsion prepared by:
      (a) heating the resin to an initial temperature of above 40° C., wherein the resin has a pH of about 9 to 12;
      (b) adjusting the pH of a wax emulsion to within about 1 pH unit of the pH of the resin; and
      (c) combining the wax emulsion with the resin and mixing while maintaining the temperature of the resin above 40° C.

12. The process of claim 11 wherein a hot press is used for the pressing and heating.

13. The process of claim 11 wherein the furnish is wood furnish.

14. The process of claim 13 wherein the wood furnish is selected from the group consisting of wood fiber, particles, scrim, flakes, strand, veneer, or combinations thereof.

15. The process of claim 11 wherein the resin is a phenol-formaldehyde resole resin.

16. The process of claim 11 wherein the initial temperature is between about 60° C. and 85° C.

17. The process of claim 16 wherein the initial temperature is between about 60° C. and 75° C.

18. The process of claim 16 wherein the temperature is maintained within 5° C. of the initial temperature.

19. The process of claim 1 wherein the pH of the wax emulsion is adjusted with an effective amount of a base.

20. The process of claim 19 wherein the base is sodium hydroxide.

* * * * *